United States Patent
Li et al.

(10) Patent No.: US 11,586,153 B1
(45) Date of Patent: Feb. 21, 2023

(54) WATCH BAND WITH ADJUSTABLE COLOR

(71) Applicant: Apple Inc., Cupertino, CA (US)

(72) Inventors: Zhengyu Li, Shanghai (CN); Chia Chi Wu, Taipei (TW); Chen Zhang, Shanghai (CN); Qiliang Xu, Livermore, CA (US)

(73) Assignee: APPLE INC., Cupertino, CA (US)

( * ) Notice: Subject to any disclaimer, the term of this patent is extended or adjusted under 35 U.S.C. 154(b) by 1153 days.

(21) Appl. No.: 16/020,848

(22) Filed: Jun. 27, 2018

(51) Int. Cl.
- *G04G 9/00* (2006.01)
- *A44C 5/14* (2006.01)
- *G02F 1/153* (2006.01)
- *G02F 1/163* (2006.01)
- *G04G 17/04* (2006.01)
- *G04G 17/06* (2006.01)

(52) U.S. Cl.
CPC .......... *G04G 9/0047* (2013.01); *A44C 5/14* (2013.01); *G02F 1/1533* (2013.01); *G02F 1/163* (2013.01); *G04G 9/0064* (2013.01); *G04G 17/045* (2013.01); *G04G 17/06* (2013.01)

(58) Field of Classification Search
CPC ..... G04G 9/0047; G04G 17/06; A44C 5/0007
See application file for complete search history.

(56) References Cited

U.S. PATENT DOCUMENTS

| | | | |
|---|---|---|---|
| 6,621,766 | B2 | 9/2003 | Brewer |
| 2009/0303041 | A1* | 12/2009 | Tehrani ............ G04F 13/04 340/540 |
| 2016/0209648 | A1 | 7/2016 | Haddick et al. |
| 2017/0075314 | A1* | 3/2017 | Perez-Feliciano ..... G04B 47/00 |
| 2017/0157466 | A1* | 6/2017 | Korpela ............... G02F 1/163 |
| 2018/0138831 | A1* | 5/2018 | Levesque ............. G06F 1/163 |
| 2018/0295951 | A1* | 10/2018 | Keller .................. A44C 5/0015 |
| 2019/0086952 | A1* | 3/2019 | Park ..................... G06F 3/017 |

FOREIGN PATENT DOCUMENTS

| | | |
|---|---|---|
| CN | 205157987 | 4/2016 |
| CN | 206964181 | 2/2018 |

* cited by examiner

*Primary Examiner* — Edwin A. Leon
*Assistant Examiner* — Jason M Collins
(74) *Attorney, Agent, or Firm* — BakerHostetler

(57) ABSTRACT

Watch bands described herein include electrochromic features that provide adjustable color control based on an applied voltage to offer a variety of colors and color combinations to be displayed by a single band. The user or a control system can control, select, and/or adjust one or more colors of the watch band for visual display. Accordingly, a variety of colors can be displayed at different times without requiring different watch bands for each color or color combination. The color changing features can be used as a visual output of information from the watch to the user.

19 Claims, 6 Drawing Sheets

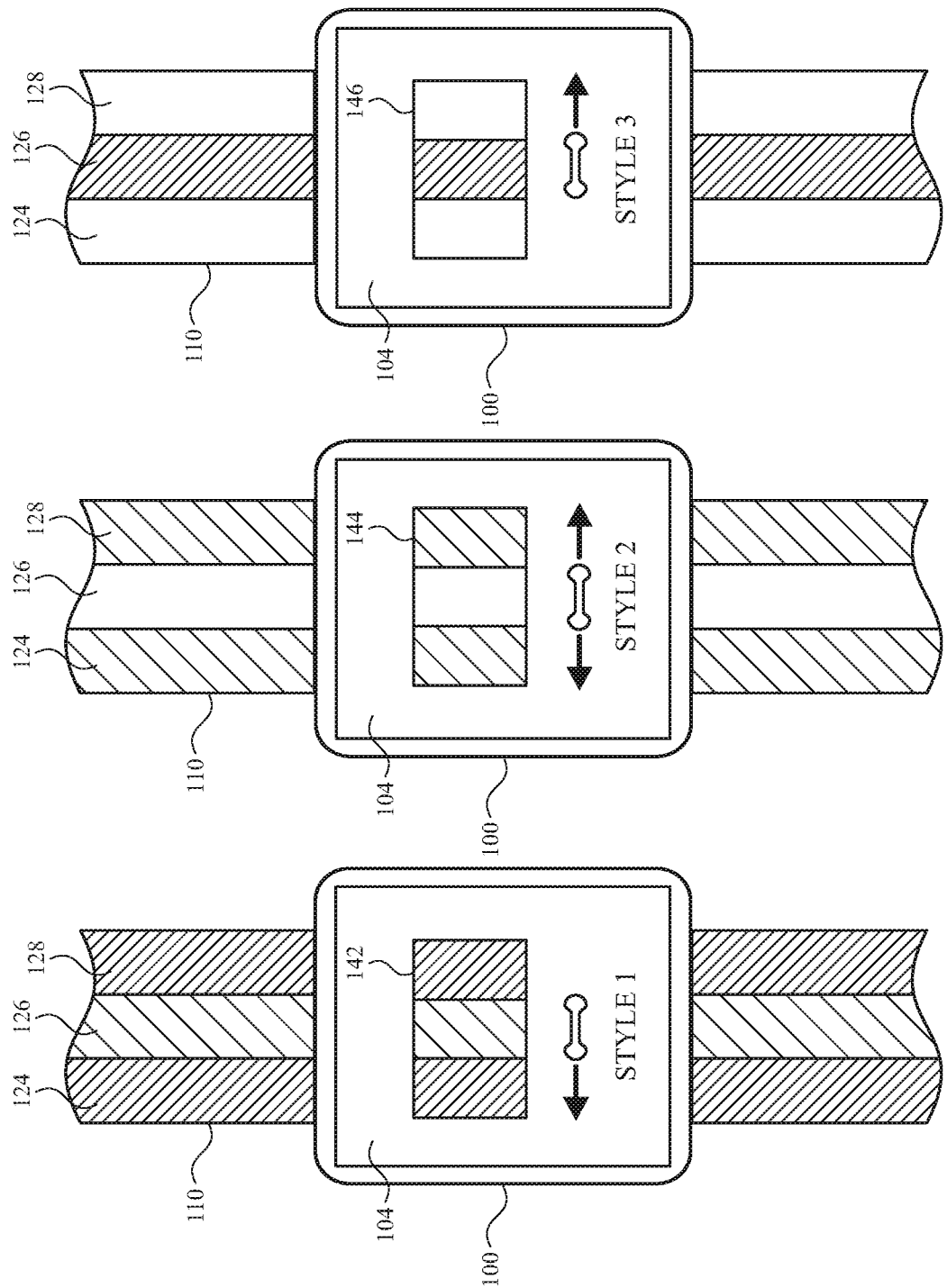

WATCH BAND WITH ADJUSTABLE COLOR

FIELD

The present description relates generally to watch bands, and, more particularly, to watch bands with adjustable color elements.

BACKGROUND

Portable electronic devices have become increasingly popular, and the features and functionality provided by portable electronic devices continue to expand to meet the needs and expectations of many consumers. For examples, watches and other wearable electronic devices offer an increasing range of functions that are useful for users.

Users may desire the ability to customize their watch bands to express variety and style. Some existing watches offer the user with an ability to remove and exchange different watch bands for customization. The embodiments described herein are directed to watch bands that provide enhanced color adjustment capabilities.

BRIEF DESCRIPTION OF THE DRAWINGS

Certain features of the subject technology are set forth in the appended claims. However, for purpose of explanation, several embodiments of the subject technology are set forth in the following figures.

FIG. 7 illustrates a top view of a watch in a first configuration, according to some embodiments of the present disclosure.

FIG. 8 illustrates a top view of the watch of FIG. 7 in a second configuration, according to some embodiments of the present disclosure.

FIG. 9 illustrates a top view of the watch of FIG. 7 in a third configuration, according to some embodiments of the present disclosure.

DETAILED DESCRIPTION

Figure 1:
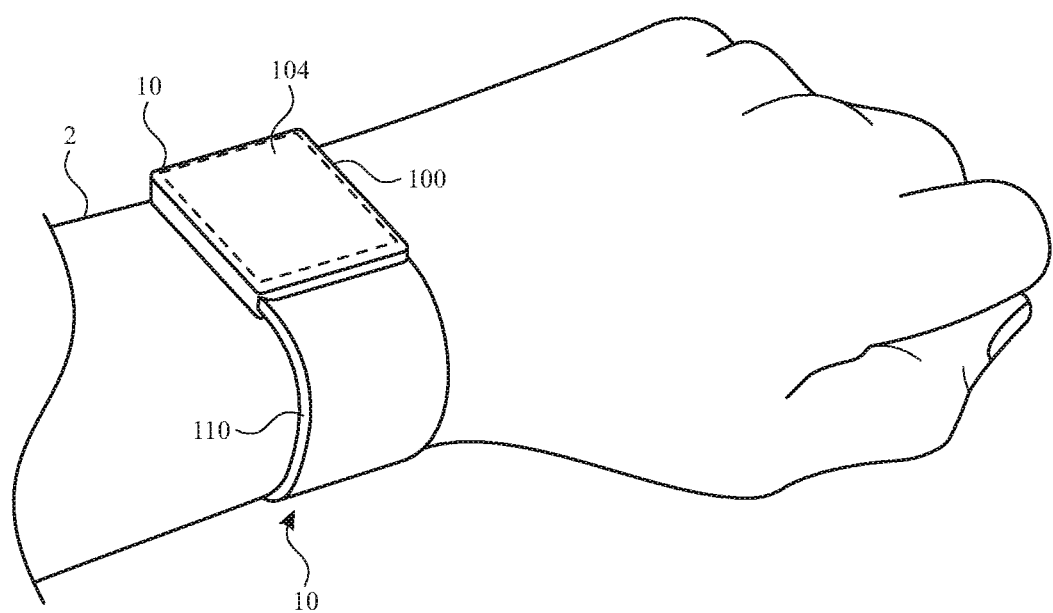
FIG. 1 illustrates a perspective view of a watch on a wrist of a user, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present description relates generally to watch bands, and, more particularly, to watch bands with adjustable color elements. Watch bands can be used to secure a watch to the writs of a user. Users may desire the ability to customize their watch bands to express variety and style. For example, a user may desire a watch band of a particular color based on the user's selection of clothing, other wearable articles, environment, or another preference. Some existing watches offer the user with an ability to remove and exchange different watch bands for customization. However, this requires the user to have a separate watch band for each of the colors or color combinations that are desired. Furthermore, the user is required to remove and exchange the watch bands whenever a different color or color combination is desired.

In contrast to traditional watches, watch bands described herein can each provide adjustable color control to offer a variety of colors and color combinations to be displayed by a single band. The user or a control system can control, select, and/or adjust one or more colors of the watch band for visual display. The color selections can be made and adjusted without removing and exchanging the watch band. Accordingly, a variety of colors can be displayed at different times without requiring different watch bands for each color or color combination.

Watch bands having adjustable colors can also be used to communicate information to a user. For example, an electronic system of the watch can control the color to provide a notification to the user. The color-adjustable elements of the watch band can be arranged and independently controlled in a manner that allows the system to display particular icons, shapes, and/or text by illuminating certain elements in a particular way. Accordingly, the color changing features can be used as a visual output of information from the watch to the user.

These and other embodiments are discussed below with reference to FIGS. 1-10. However, those skilled in the art will readily appreciate that the detailed description given herein with respect to these figures is for explanatory purposes only and should not be construed as limiting.

According to some embodiments, for example as shown in FIG. 1, a watch 10 includes a watch body 100 that is worn on a wrist 2 with a watch band 110. The watch body 100 can be portable and also attached to other body parts of the user or to other devices, structures, or objects. The watch band 110 can be flexible and encircle at least a portion of the wrist 2 of a user. By securing the watch body 100 to the person of the user, the watch band 110 provides security and convenience. In some embodiments, the watch body 100 includes a display 104 and a housing 106 for containing components.

Figure 2:
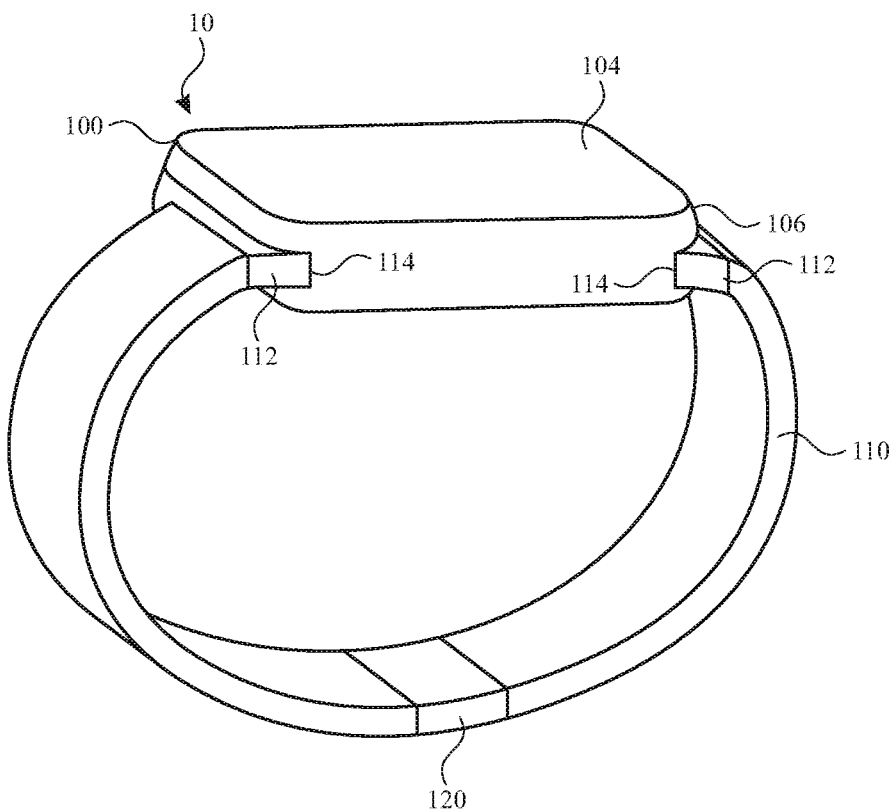
FIG. 2 illustrates a perspective view of a watch, according to some embodiments of the present disclosure.

FIG. 2 illustrates a perspective view of the watch 10, including the watch body 100 and a watch band 110. As shown, the watch body 100 includes a housing 106 that supports the display 104. The watch body 100 can be worn on a user's wrist and secured thereto by the watch band 110. The watch band 110 can be a continuous structure or assembled as separate portions (e.g., straps) that join together and provide adjustable size configurations. For example, a clasp 120 or another mechanism (e.g., buckles, buttons, latches, locks, snaps, threads, and/or pins) can be provided to adjustably connect separate portions of the watch band 110. The watch band 110 includes attachment members 112 (e.g., lugs) at opposing ends of the band that fit within respective recesses or channels 114 of the housing 106 and allow the watch band 110 to be removably attached to the housing 106. The attachment members 112 may be part of the watch band 110 or may be separable (and/or separate) from the watch band 110. Generally, the attachment members 112 may lock into the channels 114 and thereby maintain connection between the watch band 110 and the housing 106. The user may release a locking mechanism (not shown) to permit the attachment members 112 to slide or otherwise move out of the channels 114. In some watches, the channels 114 may be formed in the watch band 110 and the attachment members may be affixed or incorporated into the housing 106. While attachment members 112 and channels 114 are illustrated, it will be recognized that other attachment features, such as locks, latches, snaps, clasps, threads, and/or pins can be included on the watch band 110 for securely attaching to the watch body 100.

A watch band can provide an ability to controllably change colors. For example, a watch band can include an electrochromic feature that become a color that is determined by the presence of an applied voltage. Electrochromic features provide an ability to reversibly changing color by undergoing redox reactions. Electrochromic features change color depending on the applied voltage.

Figure 3:
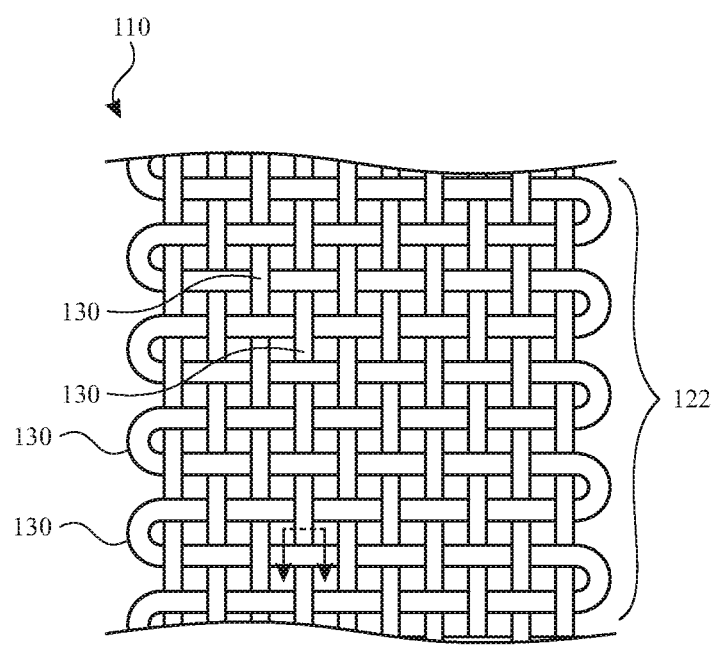
FIG. 3 illustrates a view of a woven portion of a watch band, according to some embodiments of the present disclosure.
Figure 4:
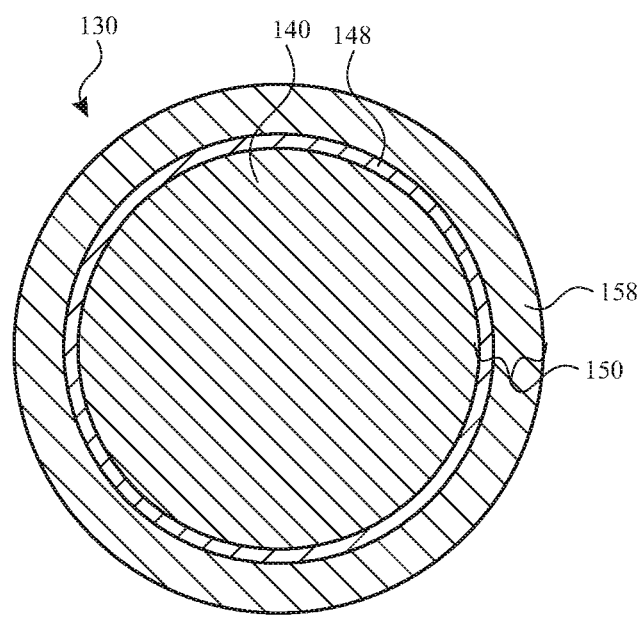
FIG. 4 illustrates a sectional view of a filament of a watch band, according to some embodiments of the present disclosure.

FIGS. 3 and 4 illustrate views of a fabric 122 of a watch band 110, according to some embodiments of the present disclosure. As shown in FIG. 3, a number of filaments 130 to form a fabric 122. FIG. 3 shows the filaments 130 (e.g., warp fibers and/or weft fibers) woven in a plain weave. In general, a fabric 122 may include any intertwined filaments 130 (woven, knitted, braided, etc.). The plain weave fabric of FIG. 3 is merely illustrative, and it will be appreciated that other weave configurations are contemplated.

Some or all of the filaments 130 can include electrochromic features. For example, one or more of the filaments 130 can include a conductor 140 and an electrochromic layer 150. The electrochromic layer 150 can be electrically connected to the conductor 140 so that voltage applied to the conductor 140 is communicated to the electrochromic layer 150. As shown in FIG. 4, the electrochromic layer 150 can include a polymer layer 148 disposed on the conductor 140. The electrochromic layer can further include an electrolyte layer 158 disposed on the polymer layer 148. The polymer layer 148 and the electrolyte layer 158 can react, in the presence of an applied voltage, to change its color, as described further herein.

The conductor 140 can include a wire of a conductive material. The conductor 140 can form a core that provides structural support (e.g., for interweaving with other filaments) and a surface for receiving the electrochromic layer 150. The conductor 140 can communicate an applied voltage to layers placed thereon.

The polymer layer 148 can coat some of or the entire conductor 140. The polymer layer 148 can include one or more electrochromic polymers that facilitate the color change described herein. For example, the polymer layer 148 can include an electrochromic polymer such as poly(3,4-ethylenedioxythiophene) (PEDOT), poly(3-methylthiophene) (P3MT), poly(2,5-dimethoxyaniline) (PDMA), polypyrrole (PPy), polyaniline (PANI), poly(aniline-N-butylsulfonate) (PANBS), EC poly{[1,3-bis(9',9'-dihexylfluoren-20-yl)azulenyl]-alt-[2",7"-(9",9"-dihexylfluorenyl]} (PDHFA), and combinations thereof. The electrochromic polymer can be selected based on the colors provided by each. For example, PEDOT can change between gray and dark blue, depending on the applied voltage. By further example, P3MT can change between blue and red, depending on the applied voltage. By further example, PDMA can change between green and yellow, depending on the applied voltage. Accordingly, desired colors and combinations of colors can be achieved by selecting appropriate electrochromic polymers.

The electrolyte layer 158 can extend along at least some of the polymer layer 148. The electrolyte layer 158 can include ions configured to react with the electrochromic polymer of the polymer layer 148 when the voltage is applied to the conductor 140. In one example, the ions are perchlorate ions. The electrolyte layer 158 can be substantially translucent to allow light from the electrochromic layer 150 to be transmitted away from the filament 130 for observation by a user.

Other layers, coatings, and/or structures can be provided to support the filament 130. For example, additional wires can be provided to add structural support and rigidity. The filament 130 can include an outer layer that encapsulates the conductor 140, the polymer layer 148, and/or the electrolyte layer 158. Such an outer layer can be substantially translucent to allow light from the electrochromic layer 150 to be transmitted away from the filament 130 for observation by a user.

In use, the filament changes colors based on applied voltages. For example, a voltage is applied to the conductor 140, which communicates the voltage to the electrochromic layer 150. Within the electrochromic layer 150, a redox reaction can be performed in the presence of the applied voltage. The applied voltage can be, for example, between −3.0 and 3.0 V. The reaction can occur between the electrochromic polymer of the polymer layer 148 and the ions of the electrolyte layer 158. The redox reaction results in a reversible color change of the electrochromic polymer. The reaction can achieve the color change effect in less than one second. The color change can be maintained for a period of time after the voltage ceases to be applied. The voltage can be applied or changed as desired to achieve a color change.

While the example of FIGS. 3 and 4 shows filaments 130 that are intertwined (e.g., interwoven), this is, merely illustrative. If desired, conductors 140 may be sandwiched between two layers of fabric 122, may be stitched into fabric 122, may be attached to the surface of edge of fabric 122, or may be integrated with fabric 122 using any other suitable method. There may be only one filament 130 containing an electrochromic layer 150 in fabric 122 or fabric 122 may include multiple filaments 130, each with an associated electrochromic layer 150. Filaments 130 may be separated into multiple layers of fabric 122 or may be formed in a single layer of fabric 122. Filaments 130 may be stacked (e.g., may overlap each other in fabric 122) or may be formed in different regions of fabric 122 (e.g., a filament 130 may be formed in a first portion of fabric 122 and a filament 130 may be formed in a second portion of fabric 122). The fabric 122 may contain only some filaments 130 with electrochromic layers 150, may contain a mixture of electrochromic filaments 130 and non-electrochromic filaments, or may be formed exclusively from electrochromic filaments 130.

It will be understood that the filaments 130 can be provided in one or more of a variety of arrangements. For example, the conductor 140 and the electrochromic layer 150 can be of any shape and size that allow them to be electrically connected. A single segment of the conductor 140 can span a substantial width of the watch band 110, and the electrochromic layer 150 can be provided as a coating thereon. The conductor 140 can form a metallic mesh of interlocking links, and the electrochromic layer 150 can be provided as a coating thereon. Different conductors 140 can span different regions of the watch band 110, as described further herein.

The conductor 140 can optionally include a shape memory alloy that changes shape when a voltage is applied to the conductor 140. For example, the conductor 140 can have a preset shape that is achieved when the voltage is applied, such that the conductor 140 changes the shape of the watch band 110 in response to the applied voltage. This applied voltage can be the same voltage that is applied to achieve a color change in the electrochromic layer 150. This shape change can provide haptic feedback to the user along with the visual indication provided by the color change.

Figure 5:
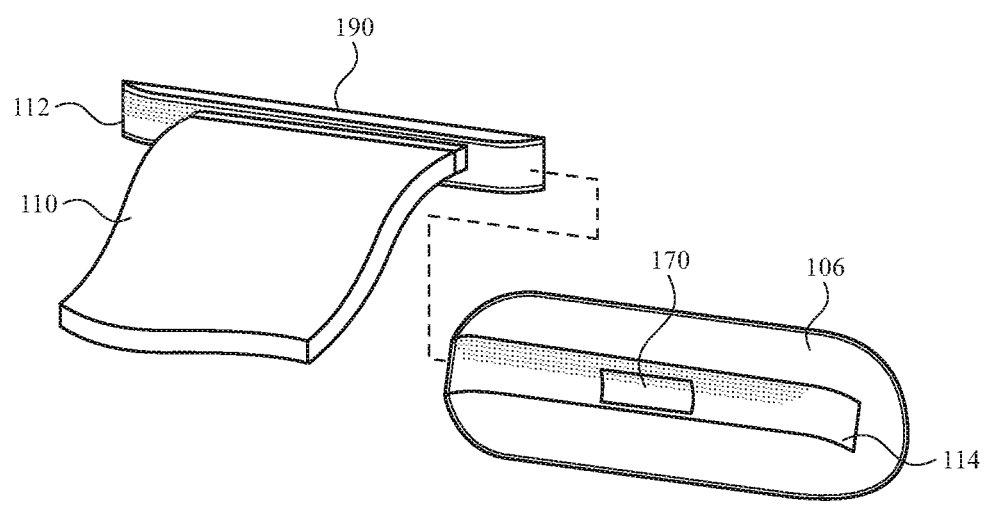
FIG. 5 illustrates a perspective view of a connection mechanism of a watch, according to some embodiments of the present disclosure.

The voltage applied to control a color change can be provided from a watch body of the watch. FIG. 5 illustrates a perspective view of a connection mechanism of a watch, according to some embodiments of the present disclosure. An electrical connection can be made and maintained upon mechanical securement of the watch band 110 to the housing 106 of the watch body. The housing 106 of the watch body can include a watch body electrical connector 170, for example, within a channel 114 formed in the housing 106. The attachment member 112 of the watch band 110 can include a watch band electrical connector 190 for electrically connecting to the watch body electrical connector 170 when the attachment member 112 is connected to the housing 106, for example by insertion into the channel 114. For example, the watch body electrical connector 170 and/or the watch band electrical connector 190 can include pogo pins or other conductive surfaces for mutual contact and electrical connection.

Figure 6:
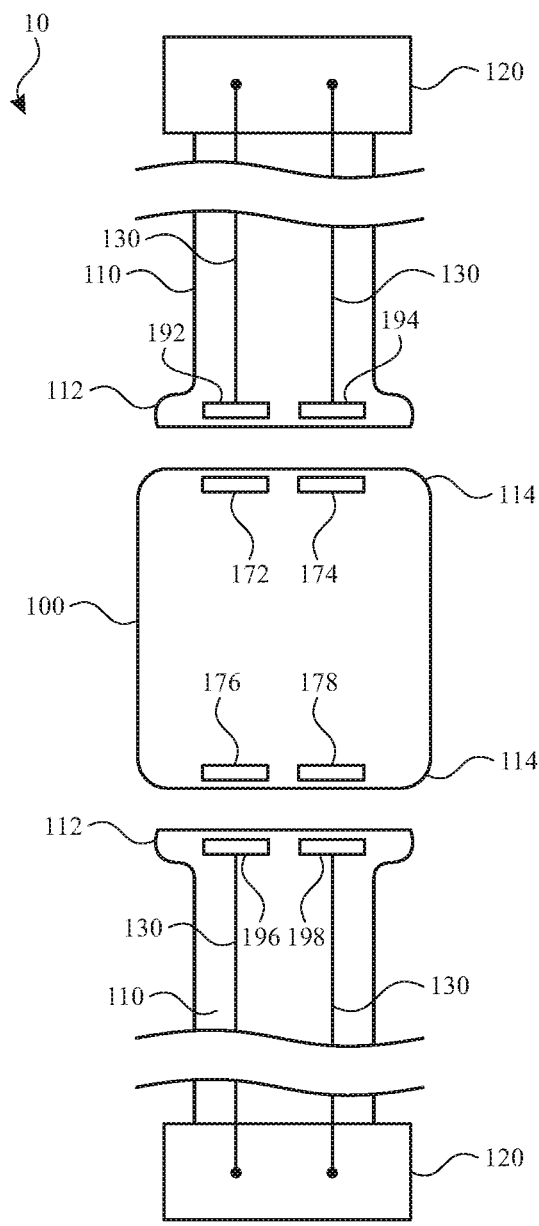
FIG. 6 illustrates a schematic view of a watch, according to some embodiments of the present disclosure.

A voltage applied from a watch body can be communicated along one or more of a variety of pathways to effect color changes in different regions of the watch band 110. FIG. 6 illustrates a schematic view of a watch, according to some embodiments of the present disclosure. As shown in FIG. 6, multiple watch body electrical connectors can be provided, each for electrically connecting to a corresponding watch band electrical connector. For example, a first watch body electrical connector 172 and a second watch body electrical connector 174 can be provided on a first side of the watch body 100 (e.g., within one of the channels 114). A third watch body electrical connector 176 and a fourth watch body electrical connector 178 can be provided on a second side of the watch body 100, opposite the first side (e.g., within the other channel 114).

As further shown in FIG. 6, multiple watch band electrical connectors can be provided, each for electrically connecting to a corresponding watch body electrical connector. For example, a first watch band electrical connector 192 and a second watch band electrical connector 194 can be provided on a first portion of the watch band 110 (e.g., at one of the attachment members 112). A third watch band electrical connector 196 and a fourth watch band electrical connector 198 can be provided on a second portion of the watch band 110, opposite the first portion (e.g., at the other attachment member 112).

A filament 130 can provide an electrical pathway along its conductor between pairs of watch body electrical connectors and watch band electrical connectors. For example, a filament 130 can extend from the first watch band electrical connector 192 to the third watch band electrical connector 196 to connect the first watch body electrical connector 172 to the third watch body electrical connector 176. By further example, another filament 130 can extend from the second watch band electrical connector 194 to the fourth watch band electrical connector 198 to connect the second watch body electrical connector 174 to the fourth watch body electrical connector 178. In this arrangement, the filaments 130 can each provide color change capabilities along an entire length of the watch band 110. Where different paths are provided across this length, the colors can be controlled independently by applying different voltages across different pairs of watch body electrical connectors. Where the watch band 110 includes separate portions, the clasp 120 can provide an electrical connection between portions of the filaments 130 when the clasps (or its parts) are joined together or closed.

Alternatively or in combination, one or more filaments can extend along a length and return to the same side of the watch band. For example, a filament 130 can extend from the first watch band electrical connector 192 to the second watch band electrical connector 194 to connect the first watch body electrical connector 172 to the second watch body electrical connector 174. By further example, another filament 130 can extend from the third watch band electrical connector 196 to the fourth watch band electrical connector 198 to connect the third watch body electrical connector 176 to the fourth watch body electrical connector 178. In this arrangement, the filaments 130 can each provide color change capabilities along their respective portions. As such, the colors can be controlled independently in different portions by applying different voltages across different pairs of watch body electrical connectors.

It will be appreciated that any number of watch body electrical connectors, watch band electrical connectors, and filaments can be provided to allow further independent color control. Where multiple filaments are provided, the multiple filaments can have different properties to achieve different colors upon application of an applied voltage. Different filaments 130 can provide electrochromic layers with different properties, to allow different ranges of colors. For example, one filament 130 can include a first electrochromic polymer having a first range of colors, and a second filament 130 can include a second electrochromic polymer different than the first electrochromic polymer and having a second range of colors different than the first range of colors. These filaments can be independently controlled with different applied voltages or controlled with the same applied voltage (e.g., from the same watch body electrical connectors).

Multiple filaments can be used to provide optical effects. For example, the colors to be induced can include red, green, and blue (RGB). By combining these three colors, a single full color image may be broken down into color fields based on the colors red, green, and blue. The appearance of a full color image can be produced by controlling individual RGB elements among the filaments 130.

One or more of the colors shown on the watch band can match or correspond to colors shown on a display of the watch body. As used herein, a color "matches" another color if it is the same wavelength of color or within about ±20 nm on the visible spectrum. FIGS. 7-9 illustrate top views of a watch in different configurations, according to some embodiments of the present disclosure. As shown in FIG. 7, the display 104 can present a first representation 142 that includes one or more colors. The representation can be a guide for a user or a native element of the display (e.g., time, date, text, icon, notification, etc.). The watch band 110 can include one or more regions that are of colors corresponding to or matching the one or more colors of the first representation 142. For example, the watch band 110 can include a first region 124, a second region 126, and/or a third region 128.

The first region 124, the second region 126, and/or the third region 128 can include filaments having different electrochromic properties. For example, electrochromic features of each of the first region 124, the second region 126, and/or the third region 128 can present a different range of colors that can be induced with one or more voltages. Alternatively or in combination, the first region 124, the second region 126, and/or the third region 128 can be independently controlled with different applied voltages. For example, the first region 124, the second region 126, and/or the third region 128 can be connected to different pairs of electrical connectors so that different voltages can be applied to each.

The colors of the watch band can change when the representation on the display changes. As shown in FIG. 8, the display 104 can present a second representation 144 that includes one or more new colors, and the first region 124, the second region 126, and/or the third region 128 can be updated to be of colors corresponding to or matching the one or more colors of the second representation 144. As shown in FIG. 9, the display 104 can present a third representation 146 that includes one or more new colors, and the first region 124, the second region 126, and/or the third region 128 can be updated to be of colors corresponding to or matching the one or more colors of the third representation 146. The user can provide a user input (e.g., via the display 104) to select between the representations. Accordingly, different colors and combinations of colors can be adaptively controlled in the different regions to match the colors on the display 104.

In some embodiments, the display 104 provides a feature of a visual user interface that corresponds to a color of the watch band 110. For example, the display 104 can display a feature that is substantially the same color as the watch band 110 (e.g., the first region 124, the second region 126, and/or the third region 128). Alternatively or additionally, the feature can be a similar color, a matching color, or a complementary color. The feature can be any visible feature of the display 104. Exemplary features include watch hands, text, numbers, symbols, graphics, charts, markers, or any displayed item. One, some, or all of the features visible on the display 104 can be altered based on the color of the watch band 110.

The color(s) of the watch band can be manually selected. The representations 142, 144, and 146 shown on the display 104 can each include a template for reference by a user when selecting the color to be provided on the watch band 110. For example, the templates can be displayed to facilitate selection by a user of a particular color or color combination. The templates can be programmed into the watch based on known electrochromic properties of the watch band and its regions. The watch band 110 can provide an identifier (e.g., make, model, serial no., etc.) to the watch body 100 to indicate the electrochromic properties that apply. Accordingly, the templates provide the user with a guide of the variety of color selections that are available based on the electrochromic properties of the watch band.

Alternatively or in combination, the color(s) of the watch band can be automatically adjusted. The representations 142, 144, and 146 shown on the display 104 can be dynamically updated elements of the display 104. For example, the display 104 can be configured to display the time, date, other text, icons, and/or notifications. These and other representations can be provided on the display 104 as a matter of the watch body's functions, and the colors of the watch band 110 can be updated automatically according the updated representations.

The color changing abilities of the watch bands described herein can be applied to provide a variety of visual outputs to the user. For example, the watch bands described herein can be used to communicate information to a user. Where the filaments are arranged in a particular way, the activation of particular colors can form an indicator (e.g., text, number, graph, icons, etc.). The indicator can represent information that is recognizable to a user.

The color of one or more filaments can be progressively changed from a first color to a second color based to represent a progress indicator. By further example, the progress indicator can indicate progress of a measurable value relating to operation of the watch (e.g., countdown timer, biometric value, battery status, etc.). The progress indicator can correspond to a current state between two end points (e.g., "start" and "end", "0%" and "100%", "empty" and "full", etc.). As the progress indicator progresses from one end point to the other, the color changes from a first color (e.g., no voltage applied) to a second color (e.g., voltage applied). Alternatively or in combination, the colors of separate filaments can be sequentially changed to represent the progress indicator.

The color of one or more filaments can be changed to represent an event or notification. Such events or notifications include incoming calls, messages, emails, reminders, and others processed by the watch. The notification can indicate an alert based on a biometric reading or relating to the health of the user. Accordingly, the color changing features can be used as a visual output of information from the watch to the user.

Figure 10:
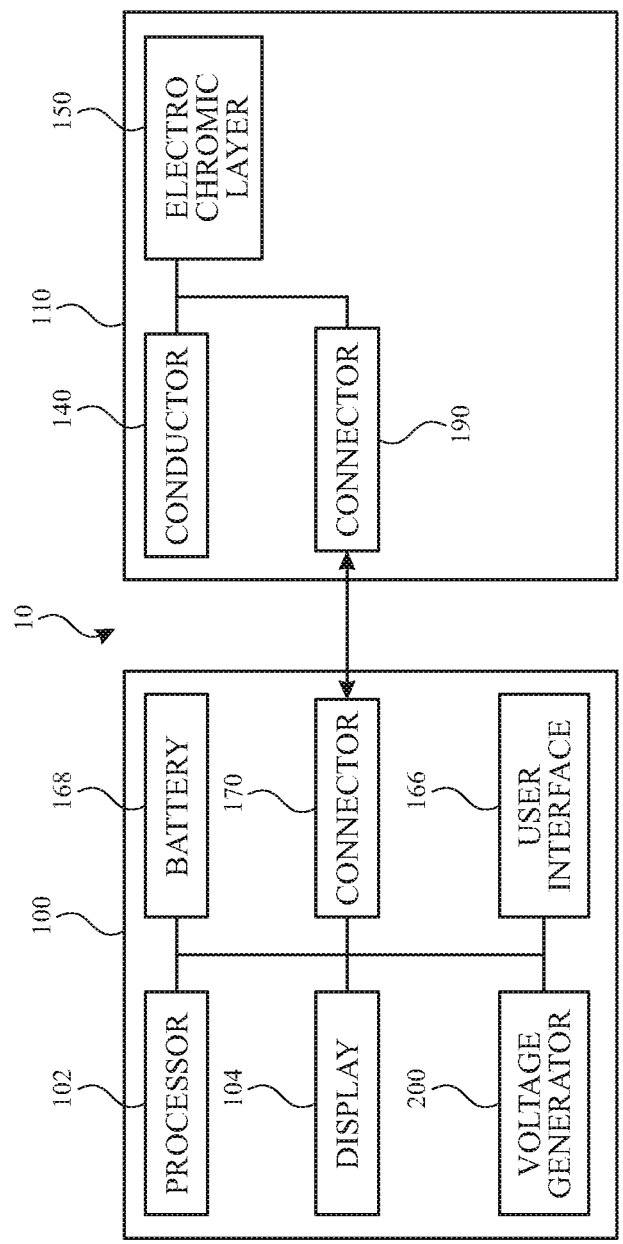
FIG. 10 illustrates a block system diagram of a watch, according to some embodiments of the present disclosure.

FIG. 10 illustrates a block system diagram of a watch 10, including the watch body 100 and the watch band 110. The watch body 100 can include components for interacting with a user, the watch band 110, and/or another device. The watch body 100 can include components that facilitate operation of the electrochromic features.

As described above, the watch band 110 can operate independently of the watch body 100. Alternatively or in combination, the watch band 110 can operate in concert with the watch body 100. The watch body 100 and the watch band 110 can include appropriate circuitry and connections to perform these operations.

As shown in FIG. 10, the watch body 100 can include components for interacting with a user. For example, the display 104 may provide an image or video output for the watch body 100. The display 104 may also provide an input surface for one or more input devices such as a touch sensing device, force sensing device, temperature sensing device, and/or a fingerprint sensor. The display 104 may be any size suitable for inclusion at least partially within the housing of the watch body 100 and may be positioned substantially anywhere on the watch body 100. The watch body 100 can further include one or more other user interfaces 166, for receiving input from and/or providing output to a user. For example, one or more buttons, dials, crowns, switches, or other devices can be provided for receiving input from a user. The user interface 166 can include a speaker, a microphone, and/or a haptic device. A haptic device can be implemented as any suitable device configured to provide force feedback, vibratory feedback, tactile sensations, and the like. For example, in one embodiment, the haptic device may be implemented as a linear actuator configured to provide a punctuated haptic feedback, such as a tap or a knock.

As further shown in FIG. 10, the watch body 100 includes one or more processors 102 that include or are configured to access a memory having instructions stored thereon. The instructions or computer programs may be configured to perform one or more of the operations or functions described with respect to the watch 10. The processors 102 can be implemented as any electronic device capable of processing, receiving, or transmitting data or instructions. For example, the processors 102 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processors, or other suitably configured computing element or elements. The memory can store electronic data that can be used by the watch body 100. For example, a memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

As further shown in FIG. 10, the watch body 100 may include a battery 168 that is used to store and provide power to the other components of the watch body 100 and/or the watch band 110. The battery 168 may be a rechargeable power supply that is configured to provide power to the watch body 100 and/or the watch band 110 while being worn by the user. The watch body 100 may also be configured to recharge the battery 168 using a wireless charging system.

As further shown in FIG. 10, the watch body 100 may include a power a voltage generator 200 configured to output a voltage. The voltage generator 200 can be controlled by the processor 102 to control various parameters of electrical energy output by the voltage generator 200, such as intensity, amplitude, duration, frequency, duty cycle, polarity, etc.

As further shown in FIG. 10, the watch body 100 may include a watch body electrical connector 170 that facilitates transmission of data and/or power to or from other electronic devices across standardized or proprietary protocols. For example, a watch body electrical connector 170 can transmit electronic signals via a wireless and/or wired network connection. Examples of wireless and wired network connections include, but are not limited to, cellular, Wi-Fi, Bluetooth, infrared, RFID and Ethernet. The watch body electrical connector 170 can communicate with or sense the watch band 110 via a watch band electrical connector 190 of the watch band 110 when the watch band 110 is connected to the watch body 100 (e.g., with an attachment member 112 of the watch band 110 inserted within a channel of the watch body 100).

As further shown in FIG. 10, the watch band 110 can include a watch band electrical connector 190, a conductor 140, and an electrochromic layer 150, as discussed herein. The conductor 140 can communicate an applied voltage to the electrochromic layer 150.

It will be recognized that one, some, or all of the components of the watch body 100 of FIG. 10 can be provided, alternatively or additionally, on and/or within the watch band 110 of the watch 10. For example, a processor 102, a display 104, a battery 168, a watch body electrical connector 170, and/or a user interface 166 can be provide on the watch body 100 and/or the watch band 110. It will be further recognized that one, some, or all of the components of the watch band 110 of FIG. 10 can be provided, alternatively or additionally, on and/or within the watch body 100 of the watch 10. For example, a watch band electrical connector 190, a conductor 140, and/or an electrochromic layer 150 can be provide on the watch band 110 and/or the watch body 100.

Accordingly, watch bands described herein can each provide adjustable color control to offer a variety of colors and color combinations to be displayed by a single band. As shown, a variety of colors can be displayed at different times without requiring different watch bands for each color or color combination. Furthermore, the color changing features can be used as a visual output of information from the watch to the user. These capabilities are provided without requiring the user to remove and install a new watch band. Thus, the watch bands described herein offer capabilities that are not previously satisfied by traditional watches.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A watch comprising:
    a watch body comprising a processor configured to control a voltage generated from the watch body; and
    a watch band configured to be removably attached to the watch body, the watch band comprising filaments, each of the filaments comprising:
        a conductor wherein, when the watch band is attached to the watch body, the conductor is operatively connected to the processor and configured to receive the voltage; and
        an electrochromic layer comprising a polymer that surrounds an entirety of the conductor along a segment of the conductor, wherein the electrochromic layer is a color that is determined by the voltage when the voltage is applied to the conductor.

2. The watch of claim 1, wherein:
    the watch body further comprises a watch body electrical connector; and
    the watch band further comprises a watch band electrical connector that is electrically connected to the watch body electrical connector when the watch band is attached to the watch body, and the voltage is communicated from the watch body electrical connector to the conductor via the watch band electrical connector.

3. The watch of claim 1, wherein the watch body further comprises a display, and the processor is further configured to control the voltage so that the color of the electrochromic layer matches a color shown on the display.

4. The watch of claim 1, wherein the watch body is configured to change the voltage to provide a visual notification to a user with the color of the electrochromic layer.

5. The watch of claim 1, wherein:
    the conductor is a first conductor;
    the electrochromic layer is a first electrochromic layer;
    the color is a first color; and
    the watch band further comprises:
        a second conductor wherein, when the watch band is attached to the watch body, the second conductor is operatively connected to the processor and configured to receive the voltage; and
        a second electrochromic layer disposed on the second conductor, wherein the second electrochromic layer is a second color, different than the first color, when the voltage is applied to the second conductor.

6. The watch of claim 5, wherein the first electrochromic layer comprises a first electrochromic polymer and the second electrochromic layer comprises a second electrochromic polymer, different than the first electrochromic polymer.

7. The watch of claim 1, wherein:
    the conductor is a first conductor;
    the electrochromic layer is a first electrochromic layer;
    the color is a first color;
    the voltage is a first voltage;
    the processor is further configured to control a second voltage generated from the watch body; and the watch band further comprises:
  a second conductor wherein, when the watch band is attached to the watch body, the second conductor is operatively connected to the processor and configured to receive the second voltage; and
  a second electrochromic layer disposed on the second conductor, wherein the second electrochromic layer is a second color that is determined by the second voltage when the second voltage is applied to the second conductor.

8. A watch comprising:
a watch body comprising a display configured to display a representation in a color;
a watch band comprising an electrochromic layer; and
a processor in the watch body, the processor being configured to:
  control the color of the representation of the display; and
  control a voltage applied to the electrochromic layer so a color of the electrochromic layer matches the color of the representation on the display.

9. The watch of claim 8, wherein the watch body is configured to change the voltage when the color of the representation on the display changes to a new color so that the color of the electrochromic layer matches the new color.

10. The watch of claim 8, wherein the watch body is configured to change the voltage to provide a notification to a user.

11. The watch of claim 8, wherein the watch body is configured to receive a user input to select the color of the representation and the color of the electrochromic layer.

12. The watch of claim 8, wherein:
the representation is a first representation;
the color is a first color;
the electrochromic layer is a first electrochromic layer in a first region of the watch band;
the voltage is a first voltage;
the display is configured to display a second representation in a second color; and
the watch band further comprises a second electrochromic layer in a second region of the watch band, and the watch body is further configured to apply a second voltage to the second electrochromic layer so a second color of the second electrochromic layer matches the second color of the second representation on the display.

13. A watch band for securing a watch to a wrist of a user, the watch band comprising:
  an attachment member for removably attaching the watch band to a watch body of the watch;
  an electrical connector configured to electrically connect to the watch body when the attachment member is attached to the watch body;
  a conductor; and
  an electrochromic layer disposed on the conductor, the electrochromic layer comprising a polymer layer disposed on the conductor, the polymer layer being a color determined by a voltage applied by the watch body to the conductor; and
  an electrolyte layer disposed on the polymer layer and comprising ions configured to react with the polymer layer when the voltage is applied to the conductor to reversibly change the color of the electrochromic layer.

14. The watch band of claim 13, wherein the conductor and the electrochromic layer define one of multiple interwoven filaments.

15. The watch band of claim 13, wherein the polymer layer comprises a polymer selected from the group consisting of poly(3,4-ethylenedioxythiophene) (PEDOT), poly(3-methylthiophene) (P3MT), poly(2,5-dimethoxyaniline) (PDMA), polypyrrole (PPy), polyaniline (PANI), poly(aniline-N-butylsulfonate) (PANBS), EC poly{[1,3-bis(9',9'-dihexylfluoren-20-yl)azulenyl]-alt-[2'',7''-(9'',9''-dihexylfluorenyl]} (PDHFA).

16. The watch band of claim 13, wherein the ions are perchlorate ions.

17. The watch band of claim 13, wherein the conductor comprises a shape memory alloy that changes shape when the voltage is applied to the conductor.

18. The watch band of claim 13, wherein:
the attachment member is a first attachment member;
the electrical connector is a first electrical connector; and
the watch band further comprises:
  a second attachment member for removably attaching the watch band to the watch body; and
  a second electrical connector configured to electrically connect to the watch body when the second attachment member is attached to the watch body, wherein the first electrical connector and the second electrical connector are electrically connected to each other through the conductor.

19. The watch band of claim 18, further comprising a clasp, wherein the first electrical connector and the second electrical connector are electrically connected to each other through the clasp.

* * * * *